US011929784B2

(12) United States Patent
Shimizu et al.

(10) Patent No.: US 11,929,784 B2
(45) Date of Patent: Mar. 12, 2024

(54) WAVELENGTH DISPERSION COMPENSATION APPARATUS AND WAVELENGTH DISPERSION COMPENSATION METHOD

(71) Applicant: NIPPON TELEGRAPH AND TELEPHONE CORPORATION, Tokyo (JP)

(72) Inventors: Shimpei Shimizu, Musashino (JP); Takushi Kazama, Musashino (JP); Takayuki Kobayashi, Musashino (JP); Yutaka Miyamoto, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 34 days.

(21) Appl. No.: 17/797,266

(22) PCT Filed: Feb. 12, 2020

(86) PCT No.: PCT/JP2020/005314
§ 371 (c)(1),
(2) Date: Aug. 3, 2022

(87) PCT Pub. No.: WO2021/161411
PCT Pub. Date: Aug. 19, 2021

(65) Prior Publication Data
US 2023/0059003 A1 Feb. 23, 2023

(51) Int. Cl.
*H04B 10/2507* (2013.01)
*H04B 10/2513* (2013.01)
(Continued)

(52) U.S. Cl.
CPC ..... *H04B 10/2525* (2013.01); *H04B 10/2507* (2013.01); *H04B 10/2513* (2013.01); *H04B 10/6161* (2013.01)

(58) Field of Classification Search
CPC ..................... H04B 10/2507–2531
(Continued)

(56) References Cited

U.S. PATENT DOCUMENTS

| 2014/0099104 A1* | 4/2014 | Peters ............... H04B 10/2507 398/25 |
| 2015/0036210 A1* | 2/2015 | Asobe ................ G02F 1/3544 359/341.3 |

FOREIGN PATENT DOCUMENTS

JP 2015161827 A * 9/2015

* cited by examiner

*Primary Examiner* — Li Liu
(74) *Attorney, Agent, or Firm* — Harness, Dickey & Pierce, P.L.C.

(57) ABSTRACT

A wavelength dispersion compensating apparatus, including: a signal light generating unit which generates, from predetermined signal light, signal light having a phase correlation centered on a degenerate frequency of a phase sensitive amplifier; a dispersion compensation transmission path which compensates for a wavelength dispersion of the predetermined signal light included in the signal light; a filter which compensates for a residual wavelength dispersion after compensation by the dispersion compensation transmission path of the predetermined signal light included in the signal light; a phase sensitive amplifier which amplifies the signal light input via the dispersion compensation transmission path and the filter; a residual wavelength dispersion calculating unit which calculates a residual wavelength dispersion amount based on a measurement result of output light amplified by the phase sensitive amplifier; and a filter control unit which controls the filter so as to add a wavelength dispersion that cancels out the calculated residual wavelength dispersion amount to the predetermined signal light.

7 Claims, 8 Drawing Sheets

(51) Int. Cl.
*H04B 10/2525* (2013.01)
*H04B 10/61* (2013.01)
(58) Field of Classification Search
USPC ............ 398/29, 81, 147–150, 159, 192, 208
See application file for complete search history.

WAVELENGTH DISPERSION COMPENSATION APPARATUS AND WAVELENGTH DISPERSION COMPENSATION METHOD

CROSS-REFERENCE TO RELATED APPLICATIONS

This application is a 371 U.S. National Phase of International Application No. PCT/JP2020/005314, filed on Feb. 12, 2020. The entire disclosure of the above application is incorporated herein by reference.

TECHNICAL FIELD

The present invention relates to a wavelength dispersion compensating apparatus and a wavelength dispersion compensation method.

BACKGROUND ART

In optical fiber transmission, an optical amplifier is used which amplifies an optical signal attenuated due to transmission while maintaining its form as light. Conventional optical amplifiers represented by an erbium doped fiber amplifier (EDFA) which uses an optical fiber doped with erbium as an amplifying medium are categorized as phase insensitive amplifiers (PIA). A PIA inevitably causes degradation of an SN ratio (signal-to-noise ratio) of 3 dB or more with respect to input light in a coherent state due to intrusion of noise derived from spontaneous emission light (ASE: amplified spontaneous emission).

Among various noise factors in optical fiber transmission, the ASE noise described above degrades an optical signal-to-noise ratio (OSNR) and is a substantial factor of limiting transmission capacity and transmission distance. Securing a high OSNR requires increasing signal input power. However, an increase in energy density in an optical fiber elicits waveform distortion due to a non-linear optical effect and conversely causes property degradation. Therefore, in order to further increase distance and capacity of optical fiber transmission, it is important that ASE noise be reduced and non-linear distortion be compensated for in an optical amplifier.

Phase sensitive amplification (PSA) is being considered as means for overcoming a noise limitation of conventional PIAs. In PSA, by suppressing ASE of an orthogonal component, low-noise amplification equal to or lower than the noise limitation of a conventional PIA can be realized. There is an added effect of compensating for waveform distortion due to a non-linear optical effect.

One configuration of PSA is degenerate PSA in which a channel to be amplified is arranged at a degenerate frequency of PSA. In degenerate PSA, idler light is generated by an interaction between signal light and excitation light in a non-linear medium and an amplification effect is obtained by superposition of the signal light and the generated idler light. However, degenerate PSA also has the following problems. The first problem is that, when amplifying a wavelength-multiplexed signal, amplification must be performed in parallel using a plurality of apparatuses. The second problem is that signals having a spread of signal points on both a real number axis and an imaginary number axis of a complex plane such as a QAM (quadrature amplitude modulation) signal cannot be amplified.

In order to solve the problems described above that occur in degenerate PSA, research on non-degenerate PSA (ND-PSA) is also being actively pursued (for example, refer to PTL 1). In ND-PSA, in order to amplify a wavelength division multiplex signal or a high multilevel signal, a configuration which arranges a signal on a frequency shifted from a degenerate frequency of PSA is adopted. In ND-PSA, signal light and idler light having a complex amplitude conjugate to the signal light are generated at frequencies symmetrical with respect to the degenerate frequency and co-propagated through a transmission fiber. Furthermore, a phase sensitive amplification operation is obtained by interaction among three lightwaves of which a frequency of the signal light, a frequency of the idler light, and a frequency of excitation light differ from each other.

In order to maximize gain of PSA, it is important that a relative phase relationship among the three lightwaves of signal light, idler light, and excitation light is optimally synchronized. Among these, a shift occurs in a phase between the signal light and the idler light due to wavelength dispersion during fiber transmission. Therefore, management of wavelength dispersion is required when performing amplification by PSA.

CITATION LIST

Patent Literature

[PTL 1] Japanese Patent Application Laid-open No. 2015-161827

SUMMARY OF THE INVENTION

Technical Problem

However, as described earlier, when wavelength dispersion is present, the relative phase relationship between the signal light and the idler light is disrupted and amplification characteristics of PSA degrades. Since the farther from the degenerate frequency, the larger a phase difference derived from wavelength dispersion between the signal light and the idler light, the wider an amplification band, the smaller an allowable wavelength dispersion amount.

In recent years, a transmission band has increased significantly due to a wavelength division multiplex signal and a high symbol rate signal. In order to realize flat amplification of such wide-band signals with PSA, changing a wavelength dispersion amount during amplification to zero by the use of a dispersion compensation transmission path is conceivably a precondition. On the other hand, rigorously compensating for wavelength dispersion by transmission path design is difficult and a residual wavelength dispersion slightly remains.

While further widening a bandwidth of amplification characteristics requires residual wavelength dispersion to be also compensated for, this requires accurately comprehending a residual wavelength dispersion amount. However, in the case of degenerate PSA, a wavelength dispersion amount that directly contributes to amplification characteristics is a partial wavelength dispersion from immediately after transmission until an amplifying medium is reached. In the case of ND-PSA, a wavelength dispersion amount that directly contributes to amplification characteristics is a partial wavelength dispersion from immediately after generation of the idler light until an amplifying medium is reached.

An output of PSA is an electric field obtained by adding up signal light and idler light with a shifted relative phase and an original electric field is not retained. Therefore, existing estimation techniques based on digital signal processing after reception cannot be used. In addition, considering a PSA module in which not only an amplifying medium but various constituent elements such as an optical circuit for control are also integrated and made into a black box, there is a problem in that performing a measurement using a conventional dispersion measuring instrument is also difficult.

In consideration of the circumstances described above, an object of the present invention is to provide a technique which enables a wavelength dispersion amount that affects gain characteristics of a phase sensitive amplifier to be calculated and a wavelength dispersion to be compensated.

Means for Solving the Problem

An aspect of the present invention is a wavelength dispersion compensating apparatus, including: a signal light generating unit which generates, from predetermined signal light, signal light having a phase correlation centered on a degenerate frequency of a phase sensitive amplifier; a dispersion compensation transmission path which compensates for a wavelength dispersion of the predetermined signal light included in the signal light; a filter which compensates for a residual wavelength dispersion after compensation by the dispersion compensation transmission path of the predetermined signal light included in the signal light; a phase sensitive amplifier which amplifies the signal light input via the dispersion compensation transmission path and the filter; a residual wavelength dispersion calculating unit which calculates a residual wavelength dispersion amount based on a measurement result of output light amplified by the phase sensitive amplifier; and a filter control unit which controls the filter so as to add a wavelength dispersion that cancels out the calculated residual wavelength dispersion amount to the predetermined signal light.

An aspect of the present invention is a wavelength dispersion compensation method, including the steps of: generating, from predetermined signal light, signal light having a phase correlation centered on a degenerate frequency of a phase sensitive amplifier; compensating for a residual wavelength dispersion after compensation by a dispersion compensation transmission path which compensates for a wavelength dispersion of the predetermined signal light included in the signal light; calculating a residual wavelength dispersion amount based on a measurement result of output light amplified by a phase sensitive amplifier which amplifies the compensated signal light; and adding a wavelength dispersion that cancels out the calculated residual wavelength dispersion amount to the predetermined signal light.

Effects of the Invention

According to the present invention, a wavelength dispersion amount that affects gain characteristics of a phase sensitive amplifier can be calculated and a wavelength dispersion can be compensated.

DESCRIPTION OF EMBODIMENTS

Hereinafter, embodiments of the present invention will be described with reference to the drawings.

First Embodiment

Figure 1:
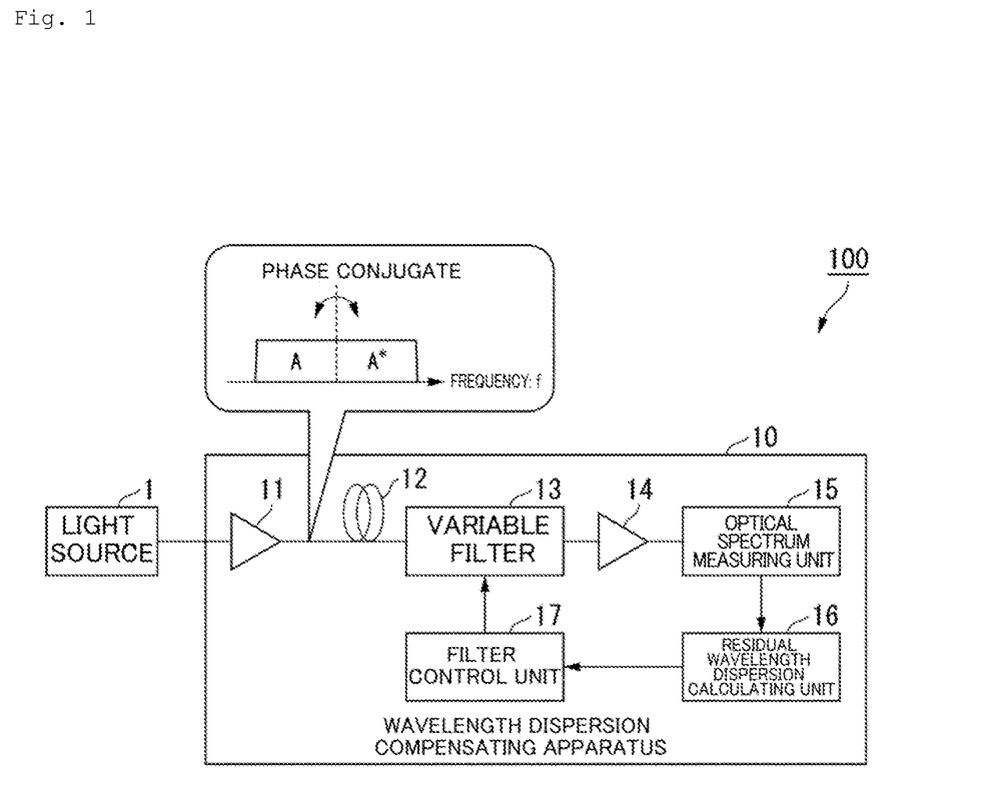
FIG. 1 is a configuration diagram representing a system configuration of an optical transmission system according to a first embodiment.

FIG. 1 is a configuration diagram representing a system configuration of an optical transmission system 100 according to a first embodiment. The optical transmission system 100 includes a wavelength dispersion compensating apparatus 10. The wavelength dispersion compensating apparatus 10 compensates for a wavelength dispersion that contributes to amplification characteristics of a phase sensitive amplifier based on predetermined signal light input from the outside. In the first embodiment, predetermined signal light output from a light source 1 is input to the wavelength dispersion compensating apparatus 10.

The wavelength dispersion compensating apparatus 10 includes a phase conjugate light generating apparatus 11, a transmission path 12, a variable filter 13, a phase sensitive amplifier 14, an optical spectrum measuring unit 15, a residual wavelength dispersion calculating unit 16, and a filter control unit 17.

The phase conjugate light generating apparatus 11 generates wide-band signal light having a phase correlation of a conjugate relationship centered on a degenerate frequency of the phase sensitive amplifier 14 from the input predetermined signal light. A degenerate frequency (=degenerate wavelength) according to the present specification refers to a frequency that constitutes a center of a band to be phase-matched (a band to be amplified) in a nonlinear medium such as periodically poled lithium niobate (PPLN) or high nonlinear fiber. The degenerate frequency is frequency of excitation light itself in a third-order nonlinear medium but corresponds to ½ of the frequency of excitation light in a second-order nonlinear medium. The phase conjugate light generating apparatus 11 is an apparatus that generates phase conjugate light by a non-linear optical effect using, for example, an $x^2$ medium such as a PPLN waveguide or an $x^3$ medium such as a high non-linear optical fiber. A technique according to Reference 1 below may be used in a specific configuration of the phase conjugate light generating apparatus 11.

(Reference 1: Japanese Patent Application Laid-open No. 2016-218173).

The phase conjugate light generating apparatus 11 not only generates phase conjugate light of signal light to be used in the phase sensitive amplifier 14 but also emits wide-band and flat spontaneous emission light in a phase conjugate relationship centered on a degenerate frequency.

In other words, the phase conjugate light generating apparatus 11 generates wide-band and flat spontaneous emission light which has a same degenerate frequency as the phase sensitive amplifier 14 that utilizes a non-linear optical effect in a non-linear optical medium and which is in a conjugate phase correlation centered on a degenerate frequency. When wide-band light with such a phase correlation is incident to the phase sensitive amplifier 14, each frequency component is phase-sensitively amplified and, as a result, a spectrum to which a gain spectrum of the phase sensitive amplifier 14 is projected without modification is obtained. In this case, the degenerate frequency of the phase conjugate light generating apparatus 11 is the same degenerate frequency as the phase sensitive amplifier 14. The phase conjugate light generating apparatus 11 is an aspect of the signal light generating unit.

The transmission path 12 compensates for wavelength dispersion of predetermined signal light included in signal light. The transmission path 12 is an aspect of the dispersion compensation transmission path.

The variable filter 13 compensates for residual wavelength dispersion after compensation by the transmission path 12 of predetermined signal light included in signal light. As the variable filter 13, a filter that functions to separate input light into frequency components using diffraction grating or the like, applies independent phase modulation to each frequency component, and remultiplexes the frequency components. The variable filter 13 is an aspect of the filter.

The phase sensitive amplifier 14 amplifies signal light input via the transmission path 12 and the variable filter 13.

The optical spectrum measuring unit 15 measures intensity of output light amplified by the phase sensitive amplifier 14.

The residual wavelength dispersion calculating unit 16 calculates a residual wavelength dispersion amount based on a measurement result (a measurement result of intensity) of output light amplified by the phase sensitive amplifier 14. The residual wavelength dispersion calculating unit 16 detects a frequency that constitutes an n (where n is an integer equal to or larger than 1)-th maximum peak or minimum peak among output light of the phase sensitive amplifier 14 to which spontaneous emission light is input, and calculates a residual wavelength dispersion amount from a difference between the detected frequency and the degenerate frequency.

The filter control unit 17 controls the variable filter 13 based on the residual wavelength dispersion amount calculated by the residual wavelength dispersion calculating unit 16. For example, the filter control unit 17 controls the variable filter 13 so as to add, to the predetermined signal light, a wavelength dispersion that cancels out the residual wavelength dispersion amount calculated by the residual wavelength dispersion calculating unit 16.

Figure 2:
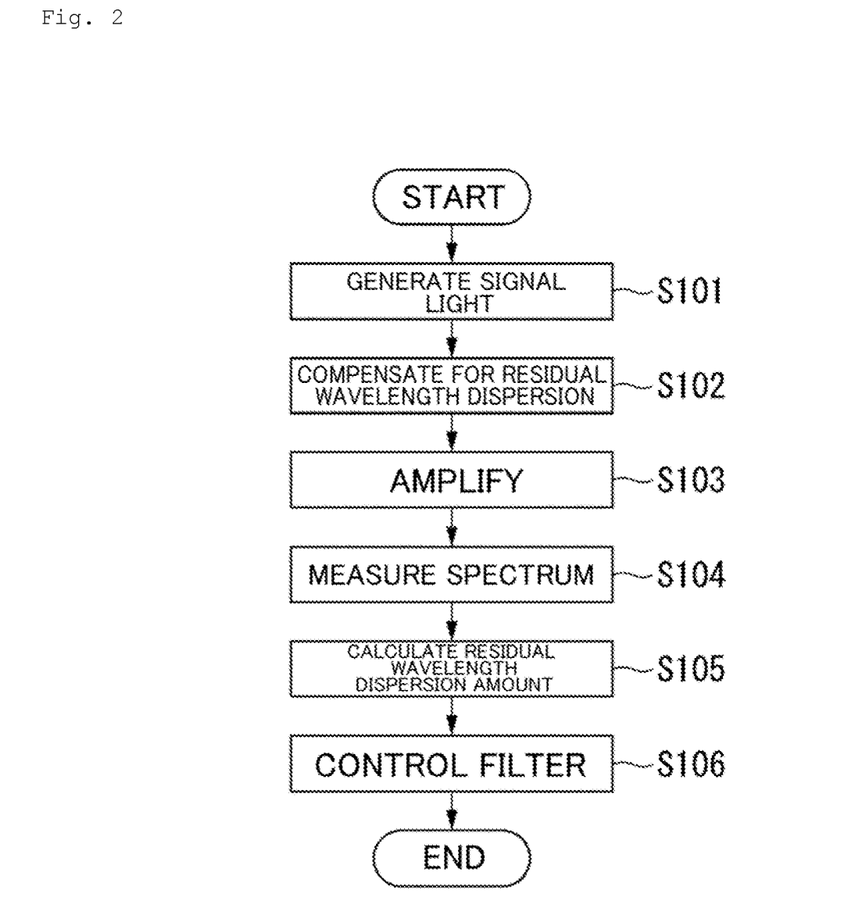
FIG. 2 is a flow chart showing a flow of wavelength dispersion processing performed by a wavelength dispersion compensating apparatus according to the first embodiment.

FIG. 2 is a flow chart showing a flow of wavelength dispersion processing performed by the wavelength dispersion compensating apparatus 10 according to the first embodiment. The processing shown in FIG. 2 is executed when signal light output from the light source 1 is input to the wavelength dispersion compensating apparatus 10.

The phase conjugate light generating apparatus 11 generates wide-band signal light having a phase correlation of a conjugate relationship centered on a degenerate frequency of the phase sensitive amplifier 14 from the input predetermined signal light (step S101). The phase conjugate light generating apparatus 11 outputs the predetermined signal light, the generated wide-band signal light, and spontaneous emission light to the phase sensitive amplifier 14 via the transmission path 12 and the variable filter 13. The predetermined signal light, the generated signal light, and the spontaneous emission light output from the phase conjugate light generating apparatus 11a are subjected to wavelength dispersion compensation in the transmission path 12, and the variable filter 13 compensates for residual wavelength dispersion not having been compensated by the transmission path 12 (step S102).

The phase sensitive amplifier 14 amplifies the input predetermined signal light, the generated wide-band signal light, and the spontaneous emission light (step S103). The optical spectrum measuring unit 15 measures spectra of the predetermined signal light, the generated wide-band signal light, and the spontaneous emission light amplified by the phase sensitive amplifier 14 (step S104). In this case, when there is a phase difference derived from wavelength dispersion between frequency components, a gain spectrum is represented by expression (1) below (for example, refer to Reference 2).

(Reference 2: M. Asobe et al., "Phase squeezing and dispersion tolerance of phase sensitive amplifier using periodically poled LiNbO3 waveguide," J. Opt. Soc. Am. B, 31, 12, 3164-3169 (2014).)

[Math. 1]

$$G(f) = G_{in}\cos^2(\Delta\phi(f)) + \frac{1}{G_{in}}\sin^2(\Delta\phi(f)) \tag{1}$$

In expression (1), $G_{in}$ denotes a gain of an in-phase component of the phase sensitive amplifier 14 which represents a maximum gain when the phase sensitive amplifier 14 operates ideally. $\Delta\phi$ denotes a phase difference due to wavelength dispersion. When wavelength dispersion is taken into consideration down to its secondary component and described as D, $\Delta\phi$ is represented by expression (2) below.

[Math. 2]

$$\Delta\phi(f) = \frac{\pi Dc}{f_0^2}(f_0 - f)^2 \tag{2}$$

In expression (2), $f_0$ represents a degenerate frequency of the phase sensitive amplifier 14 and c represents the speed of light. For example, a gain spectrum when $f_0$=193 THz and D=1.3 ps/nm has a large ripple as shown in FIG. 3.

Figure 3:
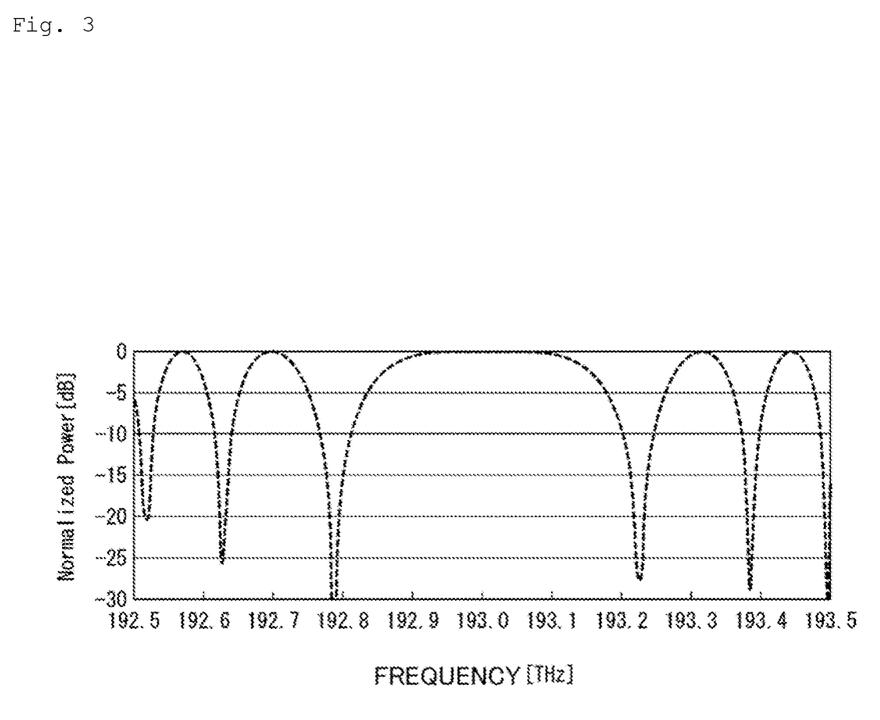
FIG. 3 is a diagram showing a gain spectrum according to the first embodiment.

FIG. 3 is a diagram showing a gain spectrum according to the first embodiment. On the other hand, the gain spectrum in expression (1) represents a phase of excitation light having been synchronized based on the $f_0$ component. As a more general expression, assuming that the phase of excitation light is to be synchronized with an arbitrary frequency component, the gain can be represented by expression (3) below.

[Math. 3]

$$G(f) = G_{in}\cos^2(\Delta\phi(f) + \phi_{offset}) + \frac{1}{G_{in}}\sin^2(\Delta\phi(f) + \phi_{offset}) \tag{3}$$

In expression (3), $\phi_{offset}$ represents a phase difference between a frequency component to serve as a reference of excitation light and the $f_0$ component, and $\Delta f$ denoting a frequency difference between the two components can be represented by expression (4) below.

[Math. 4]

$$\phi_{offset} = -\frac{\pi Dc}{f_0^2}\Delta f^2 \quad (4)$$

A gain spectrum acquired by the means described above conforms to expression (3). Each maximum peak of the gain spectrum is a point where a phase has been shifted by nπ (n: integer) from a frequency component which the excitation light has been synchronized with, and a component constituting a minimum peak is a component shifted by nπ/2. From this relationship, the residual wavelength dispersion calculating unit 16 calculates a residual wavelength dispersion amount by detecting a frequency of the maximum peak or the minimum peak of the gain spectrum (step S105). The wavelength dispersion in this case refers to a partial wavelength dispersion from generation of phase conjugate light until reaching an amplifying medium inside the phase sensitive amplifier 14 which actually affects gain characteristics of the phase sensitive amplifier 14. In conventional art, it is difficult to accurately estimate only a wavelength dispersion which affects gain characteristics of the phase sensitive amplifier 14 (from generation of idler light until reaching an amplifying medium).

The filter control unit 17 calculates a relative phase difference between respective frequency components using the residual wavelength dispersion amount calculated by the residual wavelength dispersion calculating unit 16 and expression (2). In addition, the filter control unit 17 compensates for wavelength dispersion by feeding back the calculated relative phase difference between frequency components to the variable filter 13. For example, the filter control unit 17 compensates for wavelength dispersion by controlling the variable filter 13 so as to add a wavelength dispersion that cancels out the calculated relative phase difference between frequency components to the predetermined signal light (step S106).

Figure 4:
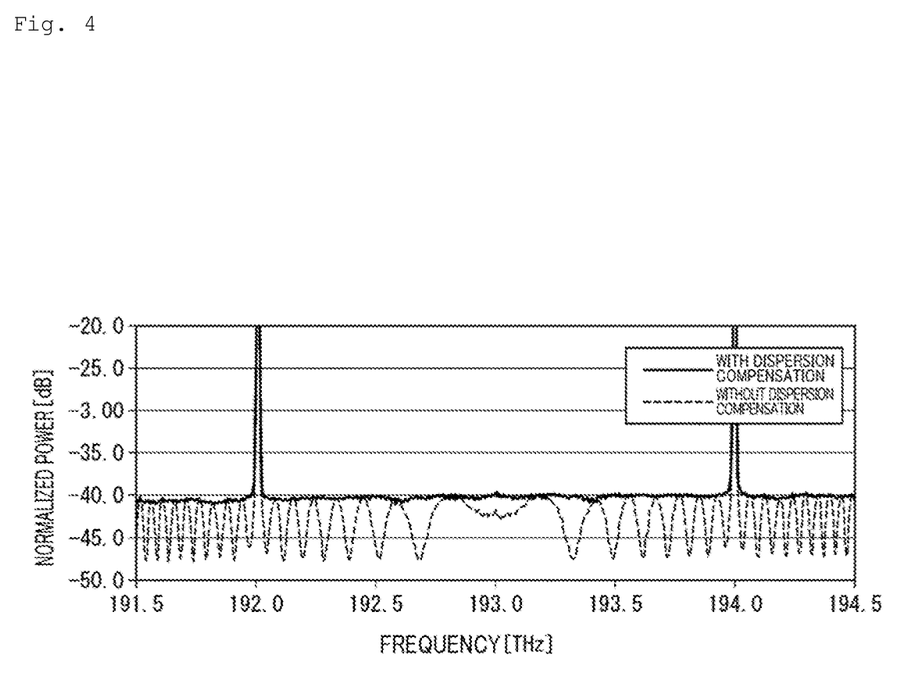
FIG. 4 is a diagram showing a result of an experiment according to the present invention.

FIG. 4 shows a result of an experiment in the present invention. In FIG. 4, an abscissa represents a frequency [THz] and an ordinate represents normalized power [dB]. In FIG. 4, the degenerate frequency is 193 THz. In addition, two peaks in the spectrum are signal light used in phase synchronization of excitation light and idler light thereof, and a phase of the excitation light has been synchronized based on CW light of 194 THz. A large gain ripple derived from residual wavelength dispersion can be confirmed in a spectrum before performing compensation. Using expression (3), the residual wavelength dispersion amount is estimated as 0.92 ps/nm from the spectrum before performing compensation. On the other hand, with the spectrum having been compensated according to the present invention, a power difference is kept under 1 dB for approximately 3.5 THz and it can be confirmed that calculation and compensation of wavelength dispersion have been performed with accuracy. After compensating for wavelength dispersion by the method according to the present invention, any signal can be transmitted in a similar manner to a conventional transmission system using non-degenerate PSA.

According to the wavelength dispersion compensating apparatus 10 configured as described above, a wavelength dispersion amount that affects gain characteristics of a phase sensitive amplifier can be calculated and a wavelength dispersion can be compensated. Specifically, the wavelength dispersion compensating apparatus 10 generates signal light having a phase correlation centered on a degenerate frequency of the phase sensitive amplifier 14 from predetermined signal light input from the outside. The wavelength dispersion compensating apparatus 10 amplifies, with the phase sensitive amplifier 14, signal light having been subjected to wavelength dispersion compensation via the transmission path 12 and the variable filter 13. The wavelength dispersion compensating apparatus 10 calculates a residual wavelength dispersion amount based on a measurement result of amplified output light. The wavelength dispersion compensating apparatus 10 controls the variable filter 13 so as to add, to the predetermined signal light, a wavelength dispersion that cancels out the calculated residual wavelength dispersion amount.

The wavelength dispersion compensating apparatus 10 calculates, based on a relationship in which each maximum peak of the gain spectrum is a point where a phase has been shifted by nπ(n: integer) from a frequency component which the excitation light has been synchronized with and a component constituting a minimum peak is a component shifted by nπ/2, a frequency of a maximum peak or a minimum peak of the gain spectrum. Accordingly, the residual wavelength dispersion amount can be accurately calculated. This wavelength dispersion refers to a partial wavelength dispersion from generation of phase conjugate light until reaching an amplifying medium inside the phase sensitive amplifier 14 which actually affects gain characteristics of the phase sensitive amplifier 14. Therefore, in the wavelength dispersion compensating apparatus 10, only a residual wavelength dispersion amount that affects gain characteristics of the phase sensitive amplifier 14 can be accurately calculated. As a result, in the wavelength dispersion compensating apparatus 10, wide-band flat gain characteristics can be obtained by compensating for an obtained residual wavelength dispersion amount. Therefore, a wavelength dispersion amount that affects gain characteristics of a phase sensitive amplifier can be calculated and a wavelength dispersion can be compensated.

The wavelength dispersion compensating apparatus 10 generates wide-band and flat spontaneous emission light which has a same degenerate frequency as the phase sensitive amplifier 14 that utilizes a non-linear optical effect in a non-linear optical medium and which is in a conjugate phase correlation centered on a degenerate frequency. Accordingly, a spectrum to which a gain spectrum of the phase sensitive amplifier 14 is projected without modification can be obtained. Therefore, a wavelength dispersion amount that affects gain characteristics of the phase sensitive amplifier can be accurately calculated. As a result, a wavelength dispersion amount that affects gain characteristics of the phase sensitive amplifier can be compensated.

Second Embodiment

In the first embodiment, special signal light (signal light generated by the phase conjugate light generating apparatus 11 according to the first embodiment) must be used to calculate wavelength dispersion. However, since wavelength dispersion changes slightly in accordance with environmental conditions such as fiber temperature, desirably, calculation and compensation can be performed in real-time during signal transmission. In consideration thereof, in the second embodiment, a configuration will be described in which residual wavelength dispersion is calculated and compensated in real-time by monitoring a gain of a specific channel.

Figure 5:
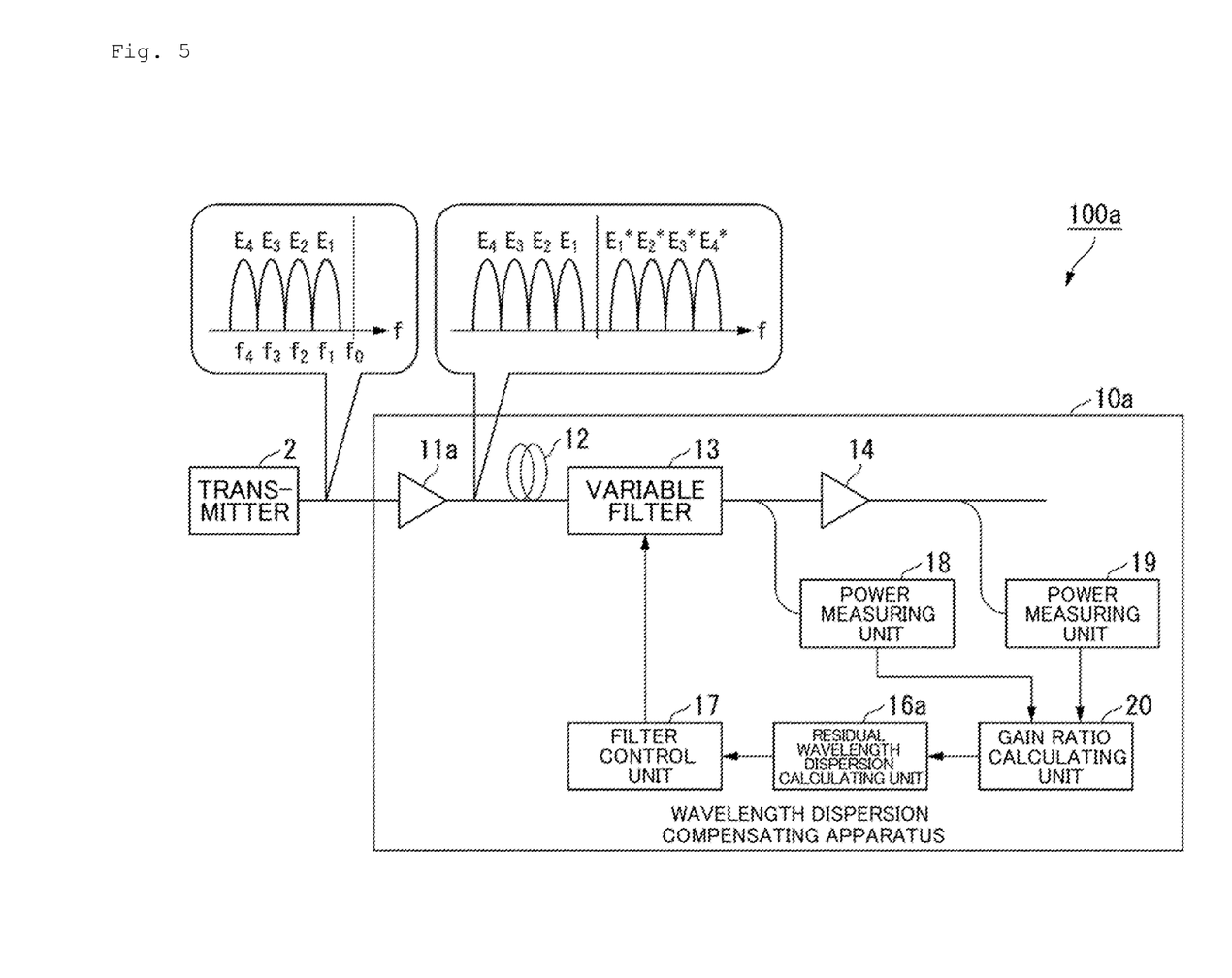
FIG. 5 is a configuration diagram representing a system configuration of an optical transmission system according to a second embodiment.

FIG. 5 is a configuration diagram representing a system configuration of an optical transmission system 100a according to a second embodiment. The optical transmission system 100a includes a transmitter 2 and a wavelength dispersion compensating apparatus 10a. The transmitter 2 and the wavelength dispersion compensating apparatus 10a are connected via an optical fiber.

The transmitter 2 is an apparatus that transmits predetermined signal light. A transmission signal to be transmitted by the transmitter 2 is a wavelength division multiplex signal (WDM signal) in an arbitrary format. In the following description, it is assumed that the transmitter 2 transmits signal light of electric fields $E_1$, $E_2$, $E_3$, and $E_4$ shown in FIG. 5.

The wavelength dispersion compensating apparatus 10a compensates for a wavelength dispersion that contributes to amplification characteristics of a phase sensitive amplifier 14 based on predetermined signal light input from the transmitter 2.

The wavelength dispersion compensating apparatus 10a includes a phase conjugate light generating apparatus 11a, a transmission path 12, a variable filter 13, the phase sensitive amplifier 14, a residual wavelength dispersion calculating unit 16a, a filter control unit 17, a power measuring unit 18, a power measuring unit 19, and a gain ratio calculating unit 20.

The wavelength dispersion compensating apparatus 10a differs in configuration from the wavelength dispersion compensating apparatus 10 in that the phase conjugate light generating apparatus 11a and the residual wavelength dispersion calculating unit 16a are included in place of the phase conjugate light generating apparatus 11 and the residual wavelength dispersion calculating unit 16 and that the power measuring unit 18, the power measuring unit 19, and the gain ratio calculating unit 20 are included while the optical spectrum measuring unit 15 has been excluded. Otherwise, the configuration of the wavelength dispersion compensating apparatus 10a is similar to that of the wavelength dispersion compensating apparatus 10. Therefore, a description of the entire wavelength dispersion compensating apparatus 10a will be omitted and configurations of the phase conjugate light generating apparatus 11a, the residual wavelength dispersion calculating unit 16a, the power measuring unit 18, the power measuring unit 19, and the gain ratio calculating unit 20 related to differences will be described.

The phase conjugate light generating apparatus 11a generates signal light having a phase correlation centered on a degenerate frequency of the phase sensitive amplifier 14 from input predetermined signal light. For example, the phase conjugate light generating apparatus 11a generates idler light which has a same degenerate frequency as the phase sensitive amplifier 14 that utilizes a non-linear optical effect in a non-linear optical medium and which has electric fields ($E_{1*}$, $E_2^*$, $E_3^*$, and $E_4^*$ in FIG. 5) which are phase-conjugate with signal light at a frequency that is symmetrical with respect to the degenerate frequency. The phase conjugate light generating apparatus 11a is an aspect of the signal light generating unit.

The residual wavelength dispersion calculating unit 16a calculates a residual wavelength dispersion amount based on a measurement result of output light amplified by the phase sensitive amplifier 14 (a measurement result of power at a predetermined optical frequency). Specifically, the residual wavelength dispersion calculating unit 16a respectively extracts, among output light of the phase sensitive amplifier 14 to which signal light and idler light are input, output light of one frequency component (for example, $f_1$) used to synchronize a phase of excitation light of the phase sensitive amplifier 14 and output light of one arbitrary frequency component (for example, $f_2$) using a bandpass filter. Next, the residual wavelength dispersion calculating unit 16a calculates a residual wavelength dispersion amount from a measurement result of power of the extracted output light of each frequency component. In this manner, even with wavelength division multiplex transmission in which many channels are present, the wavelength dispersion compensating apparatus 10a according to the second embodiment need only monitor two channels of which one channel is used for phase synchronization and another channel is arbitrary.

The power measuring unit 18 is provided between the variable filter 13 and the phase sensitive amplifier 14. The power measuring unit 18 acquires output light that is output from the variable filter 13 and measures power of output light of a specific frequency component (power at a predetermined optical frequency) among the acquired output light.

The power measuring unit 19 is provided in a stage subsequent to the phase sensitive amplifier 14. The power measuring unit 19 acquires output light that is output from the phase sensitive amplifier 14 and measures power of output light of a specific frequency component (power at a predetermined optical frequency) among the acquired output light.

The gain ratio calculating unit 20 calculates a ratio between a gain of a channel used for synchronization of the excitation light phase and a gain of an arbitrary channel.

Figure 6:
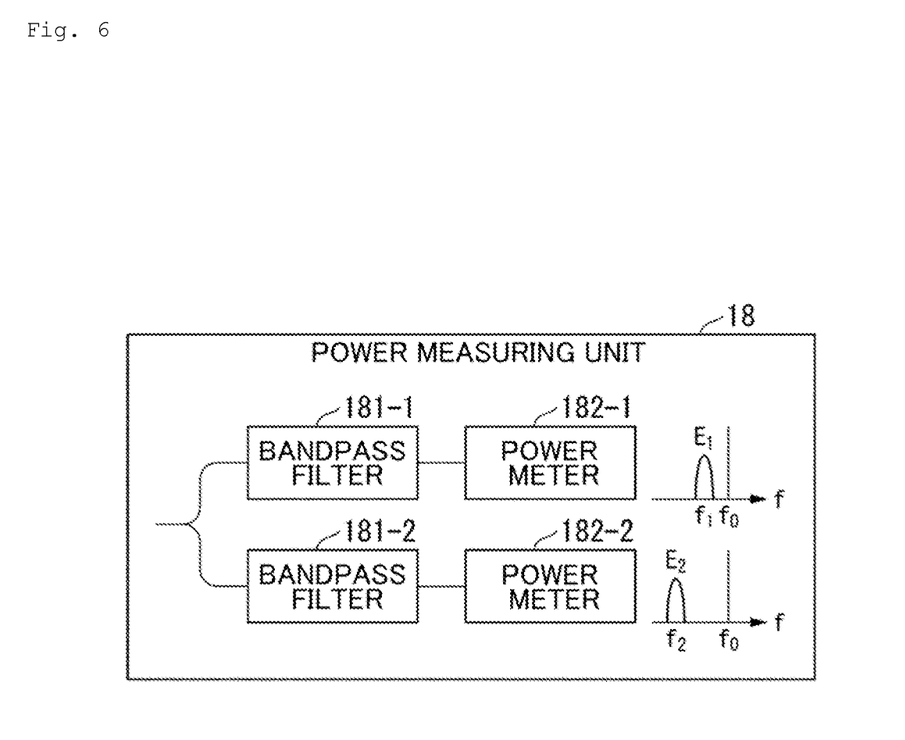
FIG. 6 is a diagram representing an internal configuration of a power measuring unit according to the second embodiment.

FIG. 6 is a diagram representing an internal configuration of the power measuring units 18 and 19 according to the second embodiment. Since the power measuring units 18 and 19 have similar configurations, the power measuring unit 18 will be described as an example in FIG. 6.

The power measuring unit 18 includes bandpass filters 181-1 and 181-2 and power meters 182-1 and 182-2.

The bandpass filters 181-1 and 181-2 are filters that pass a signal in a predetermined band.

The power meters 182-1 and 182-2 measure power of output light (power at a predetermined optical frequency). For example, the power meters 182-1 and 182-2 measure power of output light in a predetermined band (power at a predetermined optical frequency) having passed through the bandpass filters 181-1 and 181-2.

Figure 7:
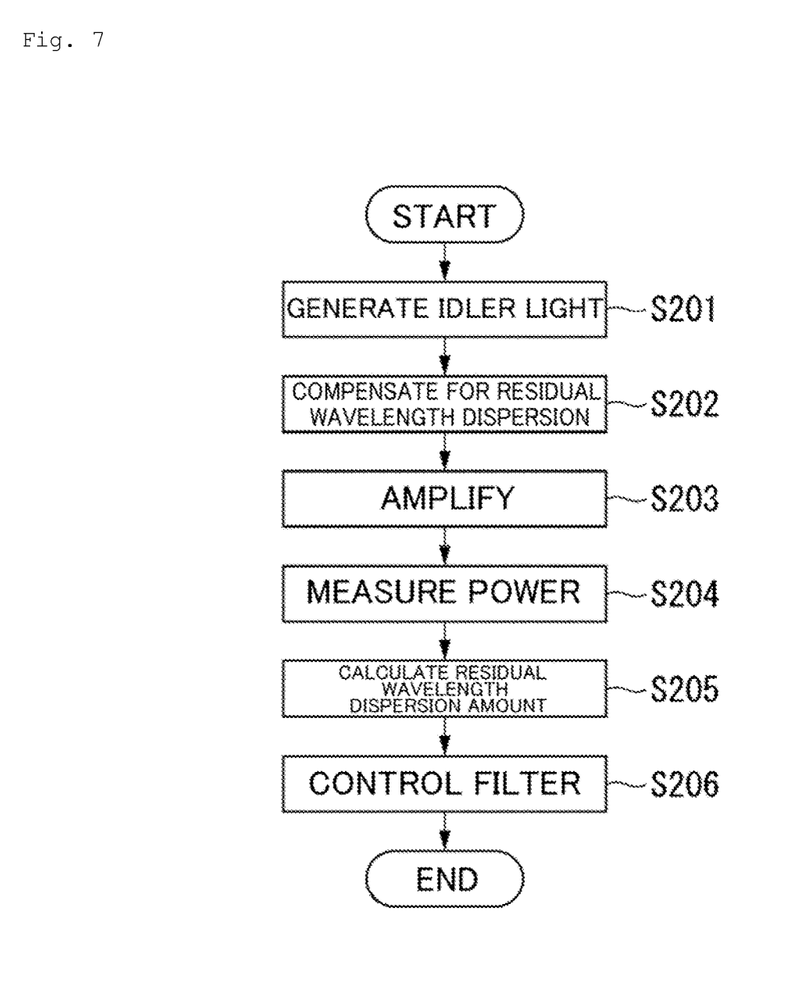
FIG. 7 is a flow chart showing a flow of wavelength dispersion processing performed by a wavelength dispersion compensating apparatus according to the second embodiment.

FIG. 7 is a flow chart showing a flow of wavelength dispersion processing performed by the wavelength dispersion compensating apparatus 10a according to the second embodiment. The processing shown in FIG. 7 is executed when signal light output from the transmitter 2 is input to the wavelength dispersion compensating apparatus 10a.

The phase conjugate light generating apparatus 11a generates idler light that is phase conjugate light of input predetermined signal light (step S201). The phase conjugate light generating apparatus 11a outputs the predetermined signal light and the generated idler light to the phase sensitive amplifier 14 via the transmission path 12 and the variable filter 13. The predetermined signal light and the idler light output from the phase conjugate light generating apparatus 11a are subjected to wavelength dispersion compensation in the transmission path 12, and the variable filter 13 compensates for residual wavelength dispersion not having been compensated in the transmission path 12 (step S202).

The phase sensitive amplifier 14 amplifies the input predetermined signal light and the idler light (step S203). In the phase sensitive amplifier 14, the idler light is used for amplification and co-propagates to a termination of the transmission path while being amplified together with the predetermined signal light. An excitation light phase of the phase sensitive amplifier 14 is assumed to be synchronized with a component at a frequency $f_1$. At this point, a ratio $G_R$ between a gain of a channel used for synchronization of the excitation light phase and a gain of an arbitrary channel is represented by expression (5) below based on expressions (3) and (4).

[Math. 5]

$$G_R = \left(\frac{G_{in}^2 + 1}{2G_{in}^2}\right) + \left(\frac{G_{in}^2 - 1}{2G_{in}^2}\right)\cos\left(\frac{2\pi Dc}{f_0^2}(\Delta f_1^2 - \Delta f_2^2)\right) \quad (5)$$

In expression (5), $\Delta f_1$ denotes a frequency difference between frequencies $f_1$ and $f_0$ and $\Delta f_2$ denotes a frequency difference between frequencies $f_2$ and $f_0$. Solving expression (5) with respect to D yields expression (6).

[Math. 6]

$$D = \frac{f_0^2}{2\pi c(\Delta f_1^2 - \Delta f_2^2)}\cos^{-1}\left(\frac{(2G_R - 1)G_{in}^2 - 1}{G_{in}^2 - 1}\right) \quad (6)$$

In this case, in the wavelength dispersion compensating apparatus 10*a*, signal light output from the variable filter 13 is input to the phase sensitive amplifier 14 and the power measuring unit 18 in a stage prior to the phase sensitive amplifier 14. Signal light output from the phase sensitive amplifier 14 is input to the power measuring unit 19. The bandpass filters 181-1 and 181-2 of the power measuring units 18 and 19 respectively extract signal light in a predetermined band. For example, it is assumed that signal light of channel 1 (for example, a frequency component $f_1$) is extracted by the bandpass filter 181-1 and signal light of channel 2 (for example, a frequency component $f_2$) is extracted by the bandpass filter 181-2. The signal light extracted by the bandpass filter 181-1 is input to the power meter 182-1. The signal light extracted by the bandpass filter 181-2 is input to the power meter 182-2.

The power meters 182-1 and 182-2 measure power of signal light of predetermined bands extracted by the bandpass filters 181-1 and 181-2 (step S204). For example, the power meter 182-1 measures power ($P_1$) of signal light of channel 1 (for example, the frequency component $f_1$). For example, the power meter 182-2 measures power ($P_2$) of signal light of channel 2 (for example, the frequency component $f_2$). Measurement results of power respectively obtained by the power measuring units 18 and 19 are input to the gain ratio calculating unit 20.

The gain ratio calculating unit 20 calculates the gain ratio $G_R$ using the input power measurement results. If power measured by the power measuring unit 18 is denoted by $P_{in}$ and power measured by the power measuring unit 19 is denoted by $P_{out}$, then a gain G can be represented by $G=P_{out}/P_{in}$. In the example described above, power of signal light of channel 1 and channel 2 is measured. In this case, power of signal light of channel 1 measured by the power measuring unit 18 can be represented as $P_{1in}$ and power of signal light of channel 2 measured by the power measuring unit 18 can be represented as $P_{2in}$. In addition, power of signal light of channel 1 measured by the power measuring unit 19 can be represented as $P_{1out}$ and power of signal light of channel 2 measured by the power measuring unit 19 can be represented as $P_{2out}$. If gains of channel 1 and channel 2 are respectively denoted by $G_1$ and $G_2$, then a measured value of the gain ratio $G_R$ can be obtained by $G_R=G_1/G_2$. Therefore, the gain ratio calculating unit 20 obtains the gain $G_1$ of channel 1 by $G_1=P_{1out}/P_{1in}$ in and obtains the gain $G_2$ of channel 2 by $G_2=P_{2out}/P_2$ in. Furthermore, the gain ratio calculating unit 20 calculates the gain ratio $G_R$ using obtained $G_1$ and $G_2$. While a configuration has been shown in which the gain ratio calculating unit 20 calculates the gain ratio $G_R$ from gains of channel 1 and channel 2, the gain ratio calculating unit 20 may use any combination of two channels as long as the combination includes one channel used to synchronize the phase of excitation light and one channel that is arbitrary.

The gain ratio calculating unit 20 outputs the calculated gain ratio $G_R$ to the residual wavelength dispersion calculating unit 16*a*. Using the gain ratio $G_R$ output from the gain ratio calculating unit 20, the residual wavelength dispersion calculating unit 16*a* calculates a residual wavelength dispersion amount based on expression (6) (step S205). It should be noted that a value of the integer n according to the first embodiment cannot be specified by this method. As a result, a range in which wavelength dispersion can be measured is limited. This measurement range is a range represented by expression (7) below.

[Math. 7]

$$D^2 < \frac{f_0^4}{4c^2(\Delta f_1^2 - \Delta f_2^2)^2} \quad (7)$$

The residual wavelength dispersion to be a measurement object has been compensated with a certain level of precision by the transmission path 12. Therefore, conceivably, such a large measurement range is not required and, in most cases, the measurement range represented by expression (7) should suffice. On the other hand, in order to expand the measurement range, means of sweeping with respect to n is conceivable such as calculating a residual wavelength dispersion $D_n$ with respect to each integer n based on expression (8), actually performing compensation using each $D_n$, and adopting $D_n$ resulting in a flat gain as a compensation amount.

[Math. 8]

$$D_n = \frac{f_0^2}{2\pi c(\Delta f_1^2 - \Delta f_2^2)} \quad (n = \cdots, -1, 0, 1, \ldots) \quad (8)$$
$$\left\{\cos^{-1}\left(\frac{(2G_R - 1)G_{in}^2 - 1}{G_{in}^2 - 1}\right) - n\pi\right\}$$

While $G_{in}$ denotes a gain in an ideal operation of the phase sensitive amplifier 14, it is difficult to accurately comprehend $G_{in}$ under a dispersion. In consideration thereof, assuming that $G_{in} \gg 1$, expression (8) can be approximated to expression (9) below.

[Math. 9]

$$D_n = \frac{f_0^2}{2\pi c(\Delta f_1^2 - \Delta f_2^2)}\{\cos^{-1}(2G_R - 1) - n\pi\} \quad (n = \cdots -1, 0, 1, \ldots) \quad (9)$$

The filter control unit 17 calculates a relative phase difference between respective frequency components using the residual wavelength dispersion amount calculated by the residual wavelength dispersion calculating unit 16a and expression (2). In addition, the filter control unit 17 compensates for wavelength dispersion by feeding back the calculated relative phase difference between frequency components to the variable filter 13 (step S206).

According to the wavelength dispersion compensating apparatus 10a configured as described above, even when special signal light is not used, a wavelength dispersion amount that affects gain characteristics of a phase sensitive amplifier 14 can be compensated. Specifically, in the wavelength dispersion compensating apparatus 10a, a gain of a specific channel is monitored in real-time, a residual wavelength dispersion amount is calculated from a monitoring result, and a wavelength dispersion amount is compensated based on the calculation result. Therefore, even when special signal light is not used, a wavelength dispersion amount that affects gain characteristics of the phase sensitive amplifier 14 can be compensated.

Third Embodiment

In the second embodiment, a variable wavelength dispersion filter represented by a spatial light modulator is required to perform compensation by controlling the variable filter 13 based on a calculated wavelength dispersion amount. The element must be arranged before an amplifying stage and causes degradation of an optical SN ratio due to insertion loss. In consideration thereof, in the third embodiment, a configuration will be described in which amplification is performed in advance using an optical amplifier in order to suppress SN ratio degradation in a variable wavelength dispersion filter.

Figure 8:
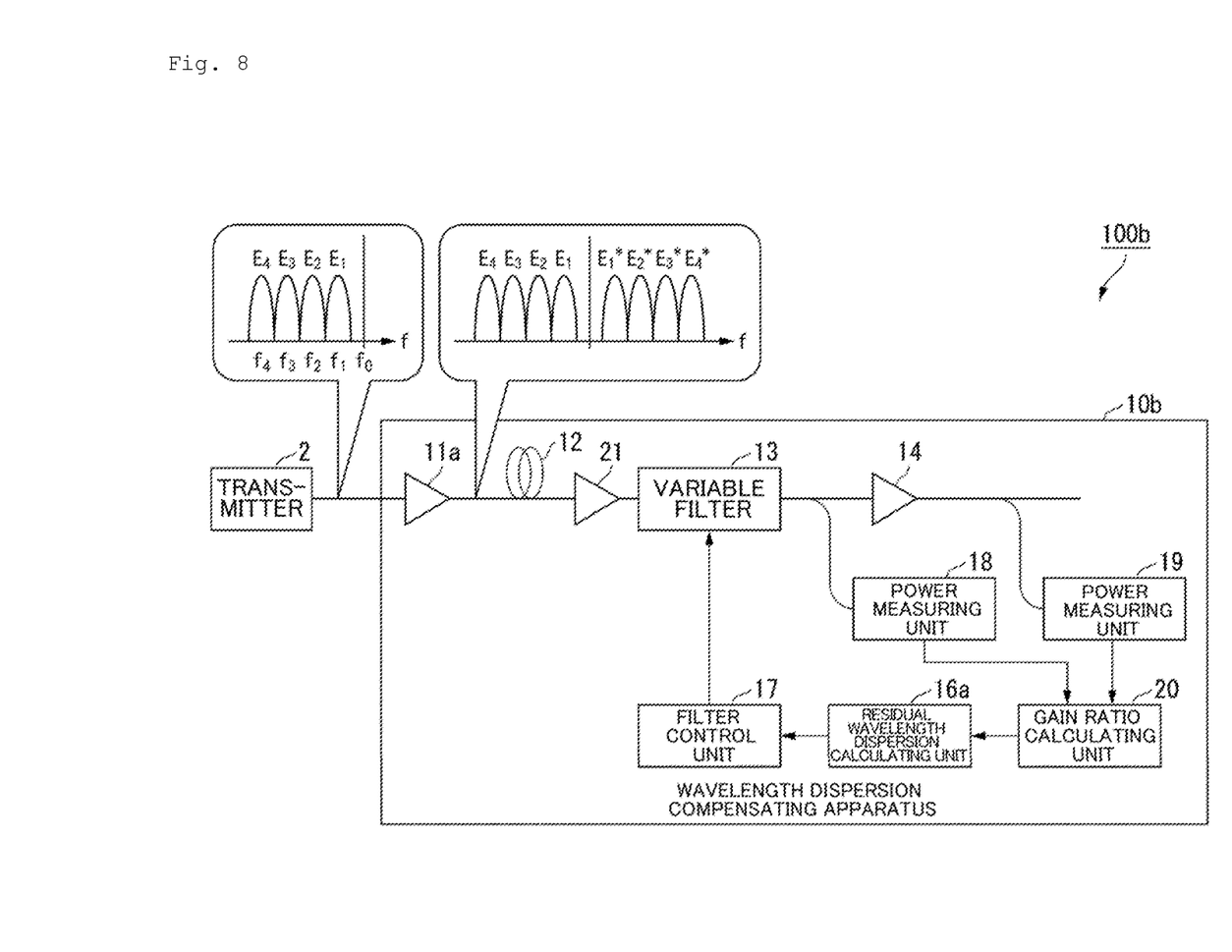
FIG. 8 is a configuration diagram representing a system configuration of an optical transmission system according to a third embodiment.

FIG. 8 is a configuration diagram representing a system configuration of an optical transmission system 100b according to a third embodiment. The optical transmission system 100b includes a transmitter 2 and a wavelength dispersion compensating apparatus 10b. The transmitter 2 and the wavelength dispersion compensating apparatus 10b are connected via an optical fiber.

The wavelength dispersion compensating apparatus 10b includes a phase conjugate light generating apparatus 11a, a transmission path 12, a variable filter 13, a phase sensitive amplifier 14, a residual wavelength dispersion calculating unit 16a, a filter control unit 17, a power measuring unit 18, a power measuring unit 19, a gain ratio calculating unit 20, and an optical amplifier 21.

The wavelength dispersion compensating apparatus 10b is similar to the wavelength dispersion compensating apparatus 10a with the exception of further including the optical amplifier 21 between the transmission path 12 and the variable filter 13. Therefore, a description of the entire wavelength dispersion compensating apparatus 10b will be omitted and a configuration of the optical amplifier 21 related to the difference will be described.

The optical amplifier 21 amplifies output light having been output via the transmission path 12 in order to suppress SN ratio degradation in a variable wavelength dispersion filter. As the optical amplifier 21, for example, both a lumped amplifier represented by an EDFA and a distributed amplifier such as a Raman amplifier are conceivable.

According to the wavelength dispersion compensating apparatus 10b configured as described above, SN ratio degradation in a variable wavelength dispersion filter can be suppressed. Therefore, dispersion compensation can be accurately performed.

A part of functions (for example, the residual wavelength dispersion calculating units 16 and 16a, the filter control unit 17, and the gain ratio calculating unit 20) of the wavelength dispersion compensating apparatuses in the embodiments described above may be realized by a computer. In this case, a program for realizing the functions may be recorded in a computer-readable recording medium and the program recorded in the recording medium may be realized by having a computer system load and execute the program. It is assumed that a "computer system" as used herein includes an OS and hardware such as peripheral devices. In addition, a "computer-readable recording medium" refers to a portable medium such as a flexible disk, a magneto-optical disk, a ROM, or a CD-ROM or a storage apparatus such as a hard disk that is built into the computer system.

Furthermore, a "computer-readable recording medium" may also include a recording medium that dynamically holds a program for a short period of time such as a communication wire when the program is to be transmitted via a network such as the Internet or a communication line such as a telephone line as well as a recording medium that holds a program for a certain period of time such as a volatile memory inside a server or a computer system to become a client. Moreover, the program described above may be any of a program for realizing a part of the functions described above, a program capable of realizing the functions described above in combination with a program already recorded in a computer system, and a program for realizing the functions using a programmable logic device such as an FPGA (Field Programmable Gate Array).

While embodiments of the present invention have been described in detail with reference to the drawings, it is to be understood that specific configurations are not limited to these embodiments and that the present invention also includes designs and the like which do not constitute departures from the gist of the present invention.

INDUSTRIAL APPLICABILITY

The present invention can be applied to calculation of a residual wavelength dispersion amount and to compensation of wavelength dispersion in a phase sensitive amplifier.

REFERENCE SIGNS LIST 10, 10a, 10b Wavelength dispersion compensating apparatus
11, 11a Phase conjugate light generating apparatus
12 Transmission path
13 Variable filter
14 Phase sensitive amplifier
15 Optical spectrum measuring unit
16, 16a Residual wavelength dispersion calculating unit
17 Filter control unit
18, 19 Power measuring unit
20 Gain ratio calculating unit
21 Optical amplifier
181-1, 181-2 Bandpass filter
182-1, 182-2 Power meter

The invention claimed is:

1. A wavelength dispersion compensating apparatus, comprising:
 a signal light generating unit which generates, from predetermined signal light, signal light having a phase correlation centered on a degenerate frequency of a phase sensitive amplifier;
 a dispersion compensation transmission path which compensates for a wavelength dispersion of the predetermined signal light included in the signal light;
 a filter which compensates for a residual wavelength dispersion after compensation by the dispersion compensation transmission path of the predetermined signal light included in the signal light;
 a phase sensitive amplifier which amplifies the signal light input via the dispersion compensation transmission path and the filter;
 a residual wavelength dispersion calculating unit which calculates a residual wavelength dispersion amount based on a measurement result of output light amplified by the phase sensitive amplifier; and
 a filter control unit which controls the filter so as to add a wavelength dispersion that cancels out the calculated residual wavelength dispersion amount to the predetermined signal light.

2. The wavelength dispersion compensating apparatus according to claim 1, wherein
 the signal light generating unit generates wide-band and flat spontaneous emission light which has a same degenerate frequency as the phase sensitive amplifier that utilizes a non-linear optical effect in a non-linear optical medium and which is in a conjugate phase correlation centered on the degenerate frequency.

3. The wavelength dispersion compensating apparatus according to claim 2, wherein
 the residual wavelength dispersion calculating unit detects a frequency that constitutes an n (where n is an integer equal to or larger than 1)-th maximum peak or minimum peak among the output light of the phase sensitive amplifier to which the spontaneous emission light is input, and calculates the residual wavelength dispersion amount from a difference between the detected frequency and the degenerate frequency.

4. The wavelength dispersion compensating apparatus according to claim 1, wherein
 the signal light generating unit generates idler light which has a same degenerate frequency as the phase sensitive amplifier that utilizes a non-linear optical effect in a non-linear optical medium and which has an electric field that is phase-conjugate with signal light at a frequency that is symmetrical with respect to the degenerate frequency.

5. The wavelength dispersion compensating apparatus according to claim 4, wherein
 the residual wavelength dispersion calculating unit respectively extracts, among the output light of the phase sensitive amplifier to which the signal light and the idler light are input, a frequency component used to synchronize a phase of excitation light of the phase sensitive amplifier and an arbitrary frequency component using a bandpass filter, and calculates the residual wavelength dispersion amount from a measurement result of power of each extracted frequency component.

6. The wavelength dispersion compensating apparatus according to claim 4, further comprising
 an amplifier which amplifies the signal light between the dispersion compensation transmission path and the filter.

7. A wavelength dispersion compensation method, comprising the steps of:
 generating, from predetermined signal light, signal light having a phase correlation centered on a degenerate frequency of a phase sensitive amplifier;
 compensating for a residual wavelength dispersion after compensation by a dispersion compensation transmission path which compensates for a wavelength dispersion of the predetermined signal light included in the signal light;
 calculating a residual wavelength dispersion amount based on a measurement result of output light amplified by a phase sensitive amplifier which amplifies the compensated signal light; and
 adding a wavelength dispersion that cancels out the calculated residual wavelength dispersion amount to the predetermined signal light.

* * * * *